United States Patent [19]

Hancosky

[11] Patent Number: 5,078,232
[45] Date of Patent: Jan. 7, 1992

[54] TREE STAND

[76] Inventor: Jack Hancosky, 8 Backus St., Rochester, N.Y. 14608

[21] Appl. No.: 542,769

[22] Filed: Jun. 25, 1990

[51] Int. Cl.$^5$ .......................... A45F 3/26; A01M 31/02
[52] U.S. Cl. ..................................... 182/187; 108/152
[58] Field of Search ................ 182/187, 188, 135, 134; 108/152

[56] References Cited

U.S. PATENT DOCUMENTS

| 3,025,107 | 3/1962 | Marshall | 182/187 |
| 3,392,802 | 7/1968 | Moore | 182/187 |
| 3,822,813 | 7/1974 | Carter | 182/187 |
| 4,337,844 | 7/1982 | Hice | 182/187 |
| 4,417,645 | 11/1983 | Untz | 182/135 |
| 4,600,082 | 7/1986 | Rauls | 182/187 |
| 4,641,727 | 2/1987 | McKelvy | 182/187 |
| 4,667,773 | 5/1987 | Davis | 182/187 |
| 4,730,700 | 3/1988 | Miller | 182/187 |

Primary Examiner—Reinaldo P. Machado
Attorney, Agent, or Firm—Lawrence P. Kessler

[57] ABSTRACT

An improved structurally sturdy, portable tree stand. The improved tree stand comprises a pair of elongated members, each of the elongated members having a portion at one end turned at substantially a right angle to its respective elongated member, and having a device for securely engaging a tree or the like. The elongated members are adjustably joined together to selectively space the elongated members a desired distance apart and maintain a substantially parallel relationship therebetween. A support platform is attached to the elongated members, and a Y-shaped member is in turn pivotably attached at the ends of the branched arms thereof to the support platform outboard of the elongated members and more than half way away from the turned portions of the elongated members. The terminous of the central arm of the Y-shaped member also includes a device for securely engaging a tree or the like. A web or chain is provided for attaching the elongated members to a tree or the like, the web or chain being adapted to engage the turned portions of the elongated members such that when the elongated members are urged to a position to extend substantially radially from the tree or the like, the tree engaging devices attached to the turned portions securely engage the tree.

8 Claims, 2 Drawing Sheets

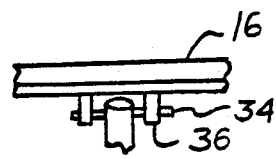
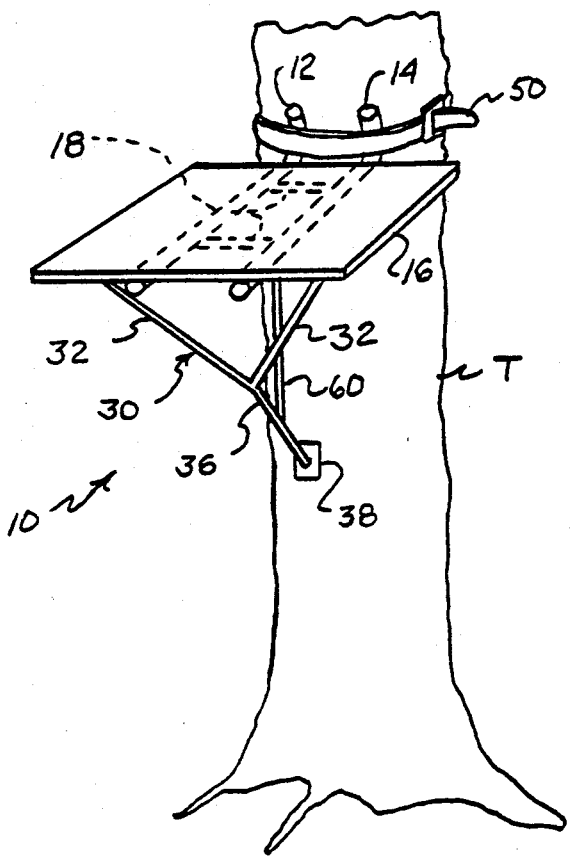
FIG. 1
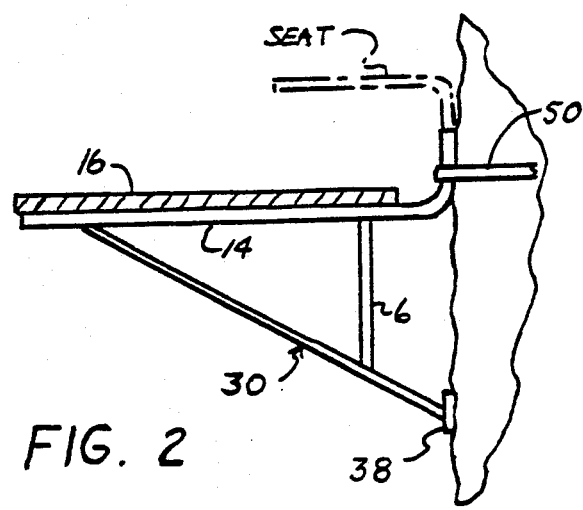
FIG. 2
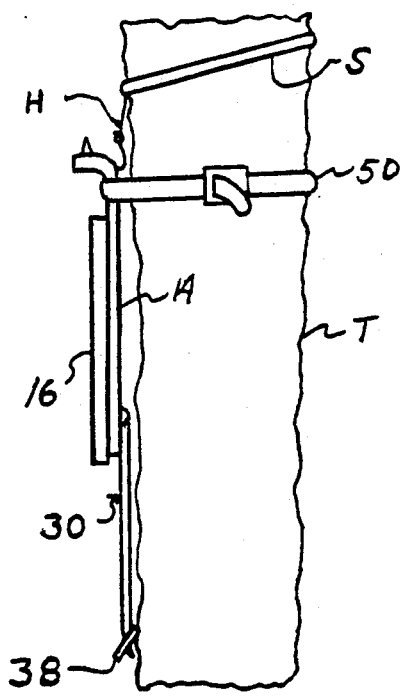
FIG. 3

TREE STAND

BACKGROUND OF THE INVENTION

This invention relates generally to platforms, commonly referred to as tree stands, for supporting an observer at an elevated location in the wild on a tree or the like, and more particularly to an improved observer supporting platform which is readily portable, easily assembled and structurally sturdy after erection.

In hunting or observing wildlife in their natural habitat, it is a well known practice for sportsmen or naturalists to utilize a support platform attached to a tree or the like. The sportsman or naturalist perched on the platform is positioned at an elevation where he can readily observe wildlife while himself being substantially unobserved. In part, the ability to remain unobserved by wildlife is due to the fact that the scent of the person perched on the elevated platform is aobve the level of the wildlife foraging on the ground.

Support platforms, commonly referred to as tree stand or deer stands, are well known (see for example U.S. Pat. No. 4,337,844, issued in the name of Hice, or U.S. Pat. No. 4,417,645, issued in the name of Untz). Typically, these platforms are secured to a tree or the like by a band encircling the tree. It is important that the platform be stable when secured to the tree, provide the user with a high degree of security, and prevent substantial permanent damage to the tree. However, conventional tree stands available today are heavy and bulky, making their transport to the observation site (often deep in the woods) difficult. Moreoever, the are difficult to assemble and time consuming to erect, often requiring the user to have special tools normally not otherwise necessary for wildlife observation. Even after assembly and erection of the known tree stands, the platforms thereof do not always provide the necessary sturdiness, stability, and security required to enable the sportsman or naturalist to safely remain in the elevated perch location.

SUMMARY OF THE INVENTION

This invention is directed to an improved structurally sturdy, portable tree stand. The improved tree stand comprises a pair of elongated members, each of the elongated members having a portion at one end turned at substantially a right angle to its respective elongated member, and having a device for securely engaging a tree of the like. The elongated members are adjustably joined together to selectively space the elongated members a desired distance apart and maintain a substantially parallel relationship therebetween. A support platform is attached to the elongated members, and a Y-shaped member is in turn pivotably attached at the ends of the branched arms thereof to the support platform outboard of the elongated members and more than half way away from the turned portions of the elongated members. The terminus of the central arm of the Y-shaped member also includes a device for securely engaging a tree or the like. A web or chain is provided for attaching the elongated members to a tree or the like, the web or chain being adapted to engage the turned portions of the elongated members such that when the elongated members are urged to a position to extend substantially radially from the tree or the like, the tree engaging devices attached to the turned portions securely engage the tree.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a view, in perspective, of the improved tree stand, according to this invention;

FIG. 2 is a side elevational view of the improved tree stand of FIG. 1 shown in its erected position;

FIG. 3 is a side elevational view of the improved tree stand of FIG. 1, similiar to FIG. 2 but with the tree stand shown in its pre-erected position;

FIG. 7 is a front elevational view, on an enlarged scale, of the pivotable connection of the Y-shaped member to the platform of the tree stand of FIG. 1;

DESCRIPTION OF THE PREFERRED EMBODIMENTS

Referring now to the accompanying drawings, FIGS. 1-3 show the improved tree stand, designated generally by the numeral 10, according to this invention. The improved tree stand 10 includes a pair of elongated members 12, 14 for supporting a platform 16 adapted to be used as an observation perch when the tree stand is erected in the manner to be fully described hereinbelow. The elongated members 12, 14, and the platform 16 are formed of a structurally rigid material such as steel, aluminum, or rigid plastic for example.

Figure 4:
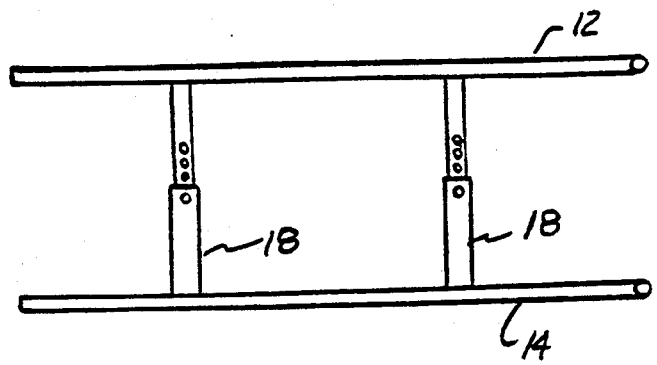
FIG. 4 is a top plan view of the elongated member arrangement of the tree stand of FIG. 1.
Figure 5:
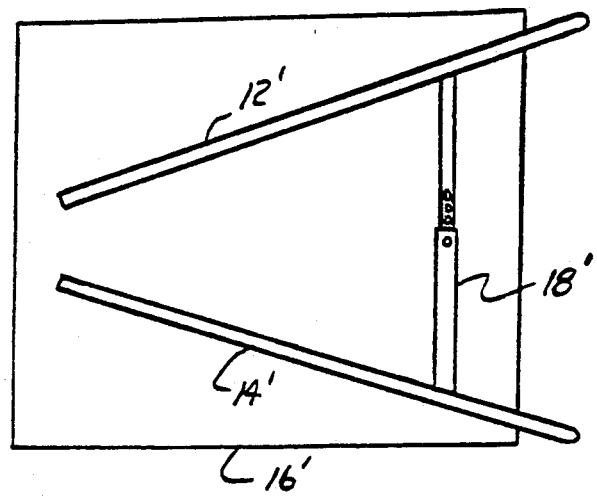
FIG. 5 is a top plan view of an alternate construction for the elongated member arrangement of the tree stand of FIG. 1.
Figure 6:
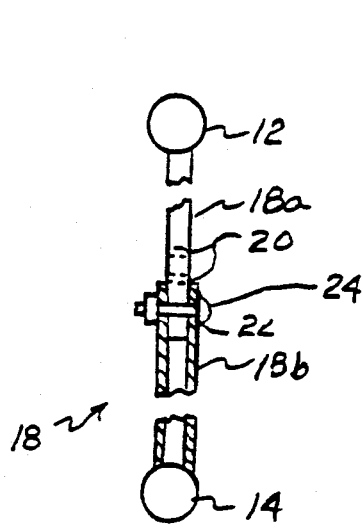
FIG. 6 is a side elevational view, in cross-section and on an enlarged scale, of the adjustment construction for the elongated member arrangement of FIG. 4.

As best seen in FIGS. 4 and 6, the elongated members 12, 14 are interconnected by ribs 18. In the preferred embodiment, the ribs 18 are adjustable in order to space the elongated members a desired distance apart in parallel relation. The ribs 18 (see FIG. 6) respectively include, for example, a rod 18a connected to one of the elongated members (e.g., member 12) slidably receivable in a tube 18b connected to the other elongated member (e.g., member 14). The rod 18a has a series of bores 20 extending there through. The bores 20 are adapted to be selectively alignable with a bore 22 extending through the tube 18b. When the diameter of a tree or the like to which the tree stand 10 is to be attached has been determined, the elongated members 12, 14 can be spaced apart a suitable distance for seating on the tree by sliding the rods 18a in the respective tubes 18b until an appropriate one of the series of bores 20 is aligned with the respective bore 22. A locking pin 24 is then inserted through the aligned bores to fix the elongated members in the desired spaced apart relation. Thereafter, the platform 16 is attached to the elongated members 12, 14 by any suitable attaching mechanisms such as locking pins, bolts or clamps for example. It should be noted that the location at which the ribs 18 are attached to the elongated members results in the ribs being spaced from the tree (designated by the letter T in FIG. 1-3) when the tree stand 10 is in its erected position. This enables the erection of the tree stand to be accomplished even where the tree contains protuberances (branches or limb stubs for example) or other obstructions extending therefrom. Additionally, the elongated members can be positioned such that the turned portions face either up or down to accomodate any obstruction. An alternate embodiment of the tree stand according to this invention shown in FIG. 5. In this embodiment, the spacial adjustment between the elongated members 12', 14' is accomplished by fixing one end of the respective elongated members to the platform 16' for pivotable movement in a plane parallel to the platform, and providing only a single adjusting rib 18' connected between the elongated members spaced from the end of such members fixed to the platform.

A substantially Y-shaped member, designated generally by the numeral 30, is pivotably attached to the platform 16. Such pivotable attachment, as best seen in FIG. 7, is accomplished, for example, by mounting the branched arms 32 of the Y-shaped member 30 on pins 34 supported on brackets 36 fixed to the underside of the platform 16. The central arm 36 of the Y-shaped member 30, at its terminus away from the branched arms 32, has a member 38 for securely engaging a tree of the like. The member 38 can be a spike-like member adapted to penetrate the surface of the tree or, alternatively a V-like member adapted to have the edges opposite the apex of the V engage and seat securely on such surface. In order to provide structural stability for the tree stand 10 in its erected position, the brackets 36 are located outboard of the maximum spaced location of the elongated members 12, 14 and substantially more than half way away from the ends of the elongated members which engage the tree or the like. In this manner when the tree stand 10 is in its erected position (to be described fully hereinbelow), the point of support for the platform 16 provided by the Y-shaped member 30 is located a sufficient distance from the tree to be well beyond the center of gravity of the user perched on the platform 16 of the tree stand.

Figure 8:
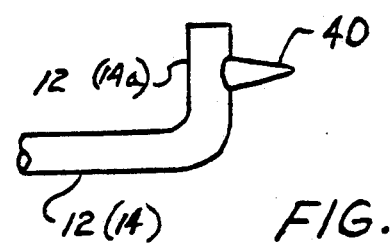
FIG. 8 is a side elevational view, on an enlarged scale, of the tree engaging portion of the elongated member arrangement of FIG. 4.
Figure 9:
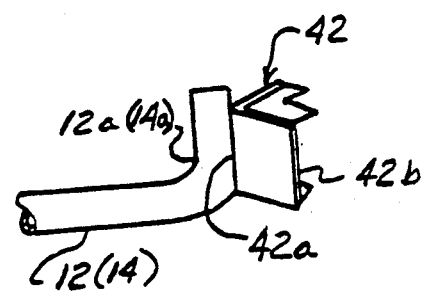
FIG. 9 is a side elevational view, on an enlarged scale, of an alternate embodiment of the tree engaging portion of the elongated member arrangement of FIG. 4.

The elongated members 12, 14 respectively have portions 12a, 14a at one end thereof turned at substantially a right angle to the longitudinal axis of the elongated members. The turned portions 12a, 14a respectively have devices attached thereto for securely engaging a tree of the like. As shown in FIG. 8, the tree engaging device comprises a spike-like member 40 extending at substantially a right angle from the turned portion of the elongated member. The spike-like member 40 is adapted to penetrate the surface of the tree of the like, when the tree stand 10 is erected in the manner to be described hereinbelow, for secure engagement therewith. Alternatively as shown in FIG. 9, the tree engaging device comprises a V-like member 42 with the apex 42a of the V-like member attached to the turned portion in parallel relation thereto. The edges 42b of the V-like member opposite the apex 42a are adapted to engage and seat securely on the surface of the tree or the like.

With the above described construction for the tree stand 10, it is apparent that the tree stand is conveniently collapsed with the elongated members 12, 14, the support platform 16, and the Y-shaped member 30 lying in close parallel relation (see FIG. 3). In this manner, the tree stand 10 is readily carried, for example on a back pack, to the location where it is to be erected.

The assembly and erection of the tree stand 10 is also conveniently and easily accomplished. Once a desired location is found, the spacing of the elongated members 12, 14 by adjustment of the ribs 18 is set, and the support platform 16 is attached to the elongated member arrangement as described above. A tightenable belt 50, such as a web or chain for example, is placed around the selected tree or the like to encircle the tree and the elongated members 12, 14 adjacent to the respective turned portions 12a, 14a (see FIG. 2). The belt 50 is then actuated with any suitable clamping device to be tightened about the tree and the elongated members. The elongated members 12, 14 are then urged by hand toward a position substantially parallel to the ground, pivoting about the point defined by the encircling belt 50. The length of the elongated members 12, 14 enables increased leverage to raise the elongated members to the desired position while causing the turned portions 12a, 14a of the elongated members urge the tree engaging portions (40 or 42) to securely engage the tree. When the elongated members 12, 14 are positioned substantially parallel to the ground (thereby positioning the platform 16 substantially parallel to the ground), the Y-shaped member 30 is pivoted such that its tree engaging member 38 securely engages the tree (see FIG. 2). Once the belt 50 is tightened, it cannot expand. Therefore, any further movement of the elongated members relative to the tree is prevented. The tree stand 10 is thus securely and sturdily positioned to enable a user to safely perch on the platform of the tree stand. It should also be pointed out that once the tree stand 10, and thus the elongated members 12, 14 are in the erected position, the turned portions 12a, 14a of the elongated members can serve as a support for an auxillary seat (shown in phatom in FIG. 2).

As an aid in facilitating the erection of the tree stand 10, an auxillary strap S may be provide. As can be seen in FIG. 2, the strap S is attached to encircle the tree or the like above the location where it is desired to erect the tree stand 10. The strap S has a hook H attached thereto. The tree stand, in its collapsed condition, can be hung on the hook H for support thereby. This leaves both hands of the user free to assemble and erect the tree stand.

As an added safety feature for increasing the stability of the tree stand 10, a security member 60 is connectable between the platform 16 and the Y-shaped member 30 when the tree stand is in its erected position. The member 60, which may be formed of a cord of relatively high tensile strength material or an adjustable rigid arm, is set to a length corresponding to the distance between the platform and the Y-shaped member adjacent to the tree when the tree stand is int its erected position. After setting the length of the security member 60, such member is connected to the platform 16 and the Y-shaped member 30 by any suitable means, such as by typing if the security member is a cord or by fastening to suitable brackets if the security member is a rigid arm. The security member 60 thus forms one leg of a rigid triangle with the platform 16 and the Y-shaped member 30 making up the remaining legs. This prevents the Y-shaped member from being able to become displaced and failing to thereafter support the platform.

While the tree stand 10 has been particularly described with reference to location on a tree for the use by a sportsman or naturalist, it is of course understood that it has other significant applilcations. As an illustrative example, the tree stand could readily be ued to great advantage on common utility poles. The material from which the tree stand is fabricated could be insulative to provide a further safety feature when used in this environment.

The invention has been described in detail with particular reference to the preferred embodiments thereof, but it will be understood that variations and modifications can be effected within the spirit and scope of the invention.

I claim:

1. An improved structurally sturdy, portable tree stand comprising:
   a pair of elongated members, each of said elongated members having a portion at one end turned at substantially a right angle to the longitudinal axis of its respective elongated member, and means for adjustably joining said elongated members together to selectively space said elongated members a desired distance apart and maintain a substantially parallel relationship therebetween;
   means attached to said turned portions of said elongated members for securely engaging a tree or the like;
   a support platform attachable to said elongated members;
   a Y-shaped member pivotably attached at the ends of the branched arms thereof to said platform outboard of said elongated members and more than half way away from said turned portions of said elongated members;
   means attached to the terminus of the central arm of said Y-shaped member for securely engaging a tree or the like; and
   means for attaching said elongated members to a tree or the like, said attaching means adapted to engage said turned portions of said elongated members such that when said elongated members are urged to a position to extend substantially radially from said tree or the like, said tree engaging means attached to said turned portions securely engage said tree of the like.

2. The invention of claim 1 wherein said means for attaching said elongated members to a tree or the like includes a belt adapted to encircle the tree or the like and the elongated members adjacent to the turned portions thereof, and a means for enabling the belt to be tightened whereby said turned portions of said elongated members pivot to engage said tree engaging means attached thereto in secure engagement with said tree.

3. The invention of claim 1 further including means for safely maintaining the angular relationship between said support platform and said Y-shaped member when said elongated members are attached to said tree by said attaching means.

4. The invention of claim 3 wherein said safety means includes a member of a fixed dimension connected to said support platform and said Y-shaped member adjacent to said tree, 5. The invention of claim 1 wherein said tree engaging means attached to said elongated members respectively includes a spike-like members extending at substantially a right angle from said turned portion thereof.

6. The invention of claim 1 wherein said tree engaging means attached to said elongated members respectively includes a V-like member with the apex thereof parallel to said turned portion thereof.

7. The invention of claim 1 further including means attachable to said tree or the like to hang said support platform from said tree prior to attachment thereto by said attaching means.

8. An improved structurally strudy, portable tree stand comprising:
   a pair of elongated members, each of said elongated members having a portion at one end turned at substantially a right angle to the longitudinal axis of its respective elongated member, and means for adjustably joining said elongated members together to selectively space said elongated members a desired distance apart and maintain a substantially parallel relationship therebetween;
   a support platform attachable to said elongated members;
   a Y-shaped member pivotably attached at the ends of the branched arms thereof to said platform outboard of said elongated members and more than half way away from said turned portions of said elongated members;
   a member of fixed dimension connected to said platform and said Y-shaped member adjacent to said tree or the like; and
   means for attaching said elongated members to a tree or the like, said attaching means adapted to engage said turned portions of said elongated members such that when said elongated members are urged to a position to extend substantially radially from said tree or the like, said tree engaging means attached to said turned portions securely engage said tree or the like.

* * * * *